(12) United States Patent
Gumm et al.

(10) Patent No.: US 6,763,826 B1
(45) Date of Patent: Jul. 20, 2004

(54) SOLAR WATER HEATER

(76) Inventors: Robert Gumm, 19363 Stonegate Dr., Cottonwood, CA (US) 96022; Gary C. Johnson, 21121 Scheer Dr., Redding, CA (US) 96002

(*) Notice: Subject to any disclaimer, the term of this patent is extended or adjusted under 35 U.S.C. 154(b) by 0 days.

(21) Appl. No.: 09/836,574

(22) Filed: Apr. 16, 2001

Related U.S. Application Data

(60) Provisional application No. 60/198,277, filed on Apr. 17, 2000.

(51) Int. Cl.[7] ................................ F24J 2/40; F24J 2/22; F24J 2/08
(52) U.S. Cl. .................... 126/599; 126/649; 126/675; 126/698; 126/706; 126/909
(58) Field of Search ........................ 126/599, 617, 126/648, 649, 653, 655, 656, 672, 674, 675, 698, 706, 709, 909, 400

(56) References Cited

U.S. PATENT DOCUMENTS

| | | | | |
|---|---|---|---|---|
| 4,085,731 A | * | 4/1978 | Weir | 126/909 |
| 4,305,383 A | * | 12/1981 | Bloxsom | 126/698 |
| 4,422,443 A | * | 12/1983 | Arendt | 126/570 |
| 4,539,975 A | * | 9/1985 | Teagan | 126/617 |
| 4,779,610 A | * | 10/1988 | Hultmark | 126/709 |

FOREIGN PATENT DOCUMENTS

| | | | | |
|---|---|---|---|---|
| GB | 2071306 A | * | 9/1981 | 126/599 |
| WO | WO 99/20951 A1 | * | 4/1999 | |

* cited by examiner

*Primary Examiner*—Ira S. Lazarus
*Assistant Examiner*—James G. Barrow
(74) *Attorney, Agent, or Firm*—Heisler & Associates

(57) ABSTRACT

A solar water heater is provided. The heater features heat control so that a maximum temperature is automatically controlled. The heater is insulated to maintain a water temperature of water stored therein for long periods of time. The heater includes an insulated lens which transmits most solar radiation incident on its top surface through the lens. An air trap is located below the lens. A heat control valve opens the air trap to surrounding air when a maximum temperature for air within the air trap is exceeded. A heat absorption plate is located below the air trap. The plate is in contact with a heat transfer liquid within a liquid space below the plate. A heat exchanger is positioned within the space and routes water in heat transfer contact with the liquid within the space, while keeping the water isolated from the liquid within the space.

11 Claims, 5 Drawing Sheets

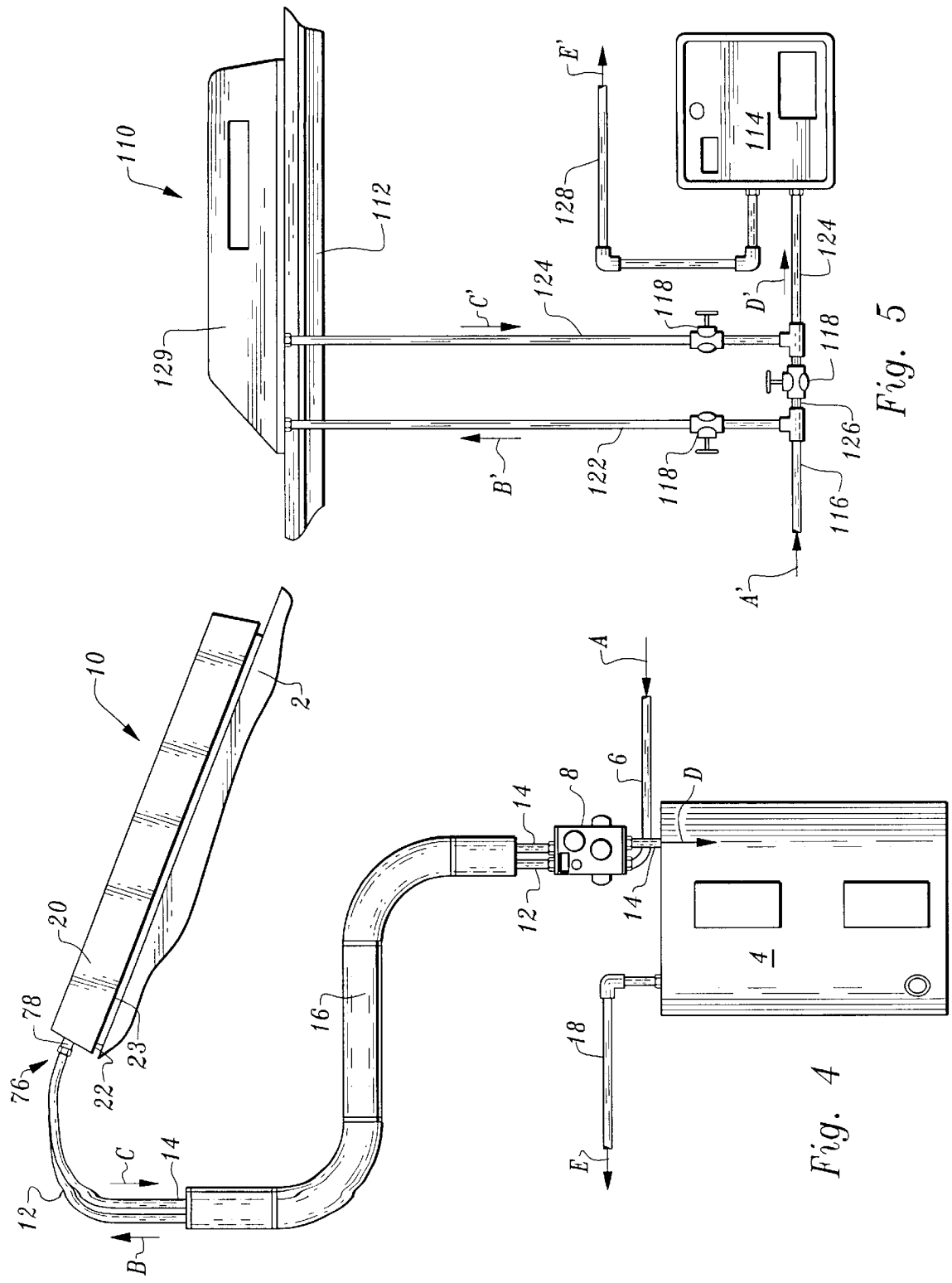

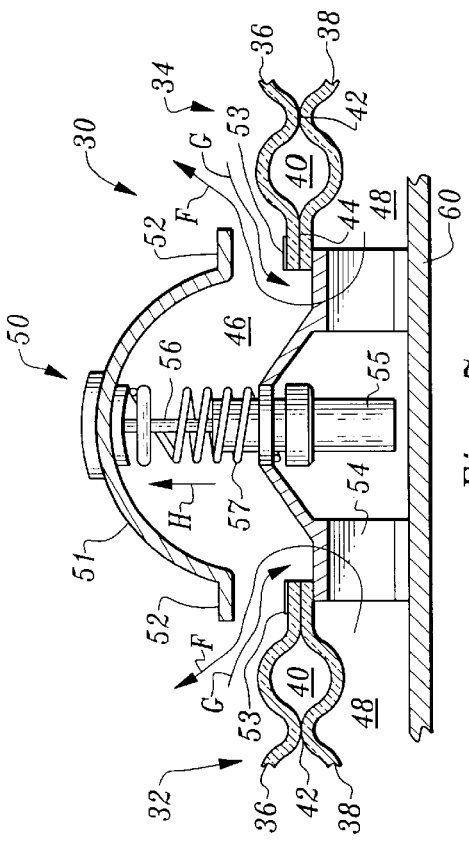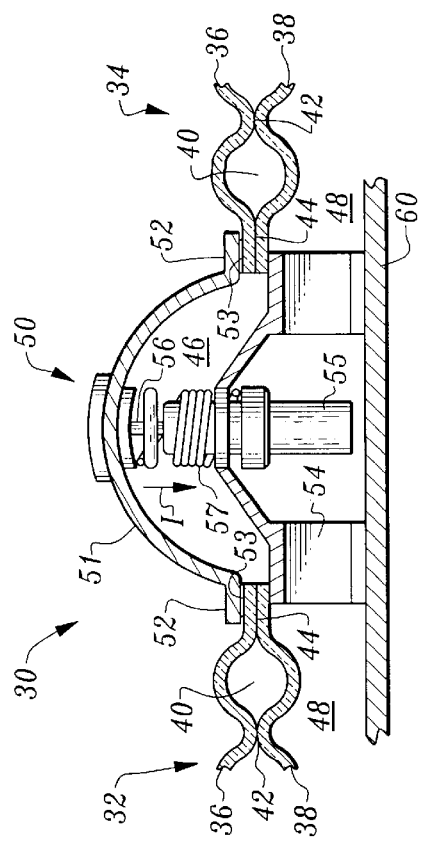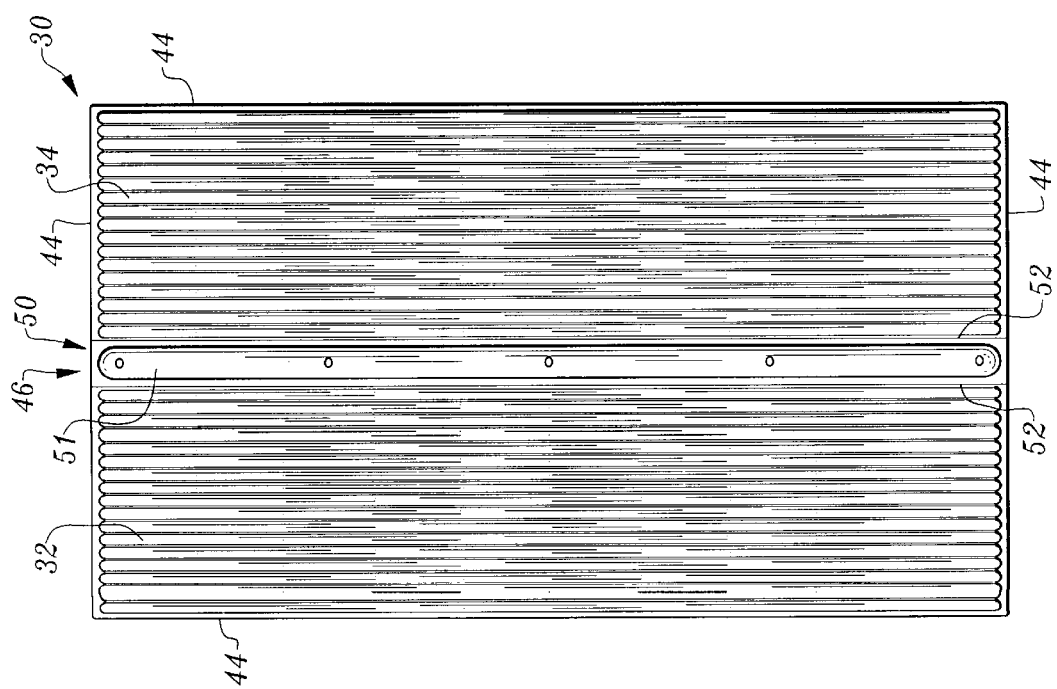

SOLAR WATER HEATER

CROSS-REFERENCE TO RELATED APPLICATIONS

This application claims benefit under Title 35, United States Code §119(e) of U.S. Provisional Application No. 60/198,277 filed on Apr. 17, 2000.

FIELD OF THE INVENTION

The following invention relates to water heaters which receive solar radiation to heat water or other fluids passing through the heater.

BACKGROUND OF THE INVENTION

Solar water heaters are well known in the prior art. Typical prior art solar water heaters route water along a pathway which is exposed to the sun and which is configured from materials which maximize an amount of heat that is absorbed from the solar radiation, for a transfer of this heat to the water passing through the water heater. For instance, black plastic tubing can be utilized which is placed in an area where it is exposed to solar radiation. As the water passes through an interior of the black plastic tubing, the black plastic tubing heats the water with heat that the tubing absorbs from solar radiation incident on the tubing. These and other prior art solar water heaters all suffer from a variety of different drawbacks which have inhibited the acceptance of solar water heaters for most water heating applications.

For instance, typical solar water heaters are either constructed from expensive materials making them cost prohibitive to use or are manufactured from materials which cannot withstand the extreme solar radiation environment for long periods of time, such that their performance degrades and they fail prematurely. Also, they are often not insulated to keep the water therein warm for extended periods after the solar radiation ceases. Accordingly, a need exists for a solar water heater which is constructed in a manner which keeps temperature sensitive components of the water heater within design temperature ranges for the materials and which has a simple construction and yet efficiently utilizes solar radiation to heat large quantities of water or other fluids in a relatively small amount of space.

SUMMARY OF THE INVENTION

This invention provides a solar water heater which is of simple compact construction for ease of installation and use and which automatically maintains a temperature of temperature critical components within their designed temperature ranges for efficient heating of the water or other fluids without exceeding temperature limits which would cause damage to the water heater. The water heater includes a housing with a base and side walls spaced from a recess by an insulated core. An upper rim of the water heater surrounds this recess and a lens spans this recess.

The lens is configured to transmit large amounts of solar radiation therethrough at a variety of different incidence angles, while also providing insulation against conduction heat transfer out of the water heater. The lens preferably includes a non-planar top surface which reduces reflection of the solar radiation away from the lens when the sun is at low angles of incidence upon the lens. The lens also includes voids which have an at least partial vacuum therein. This vacuum condition reduces conduction heat transfer out of the solar water heater through the lens.

An air trap is located directly below the lens. A heat absorption plate is located within the recess and below the air trap. The absorption plate receives and absorbs most of the solar radiation passing through the lens and through the air trap. This absorption plate heats up and causes heating of air within the air trap.

A liquid space is located within the recess and below the absorption plate. The liquid space is filled with a heat transfer liquid. A heat exchanger is located within the liquid space and includes walled chambers which enclose water and are coupled together by junctions so that a serpentine water path is provided through the chambers of the heat exchanger. Heat from the absorption plate heats the heat transfer liquid within the liquid space and this heat transfer liquid then heats the water through the walls of the heat exchanger. Insulation within the housing and within the lens, as well as the air trap itself, keeps the water within the chambers of the heat exchanger warm for significant periods of time even after solar radiation ceases (i.e. overnight).

Additionally, a heat control valve is provided to release air from the air trap. Preferably, the heat control valve is located within the lens and includes a cover which closes a gap in the lens when the heat control valve is closed and which opens to make a path for air into and out of the air trap when the heat control valve opens. When a temperature of air within the air trap reaches a maximum temperature, corresponding with the temperature at which damage may begin to occur to materials forming the lens, absorber plate, housing or heat exchanger, the heat control valve opens allowing colder air outside the air trap to come into the air trap and for hot air inside the air trap to be released from the air trap. When air within the air trap is reduced in temperature, heat absorbed by the absorber plate tends to be directed more into the air trap and then carried out of the solar water heater altogether, such that maximum temperatures for various components within the solar water heater are not exceeded. When the temperature of air within the air trap is below this maximum threshold temperature, the heat control valve closes and the air trap is allowed to trap the air and allow the air to increase in temperature. Heat absorbed by the absorber plate is then directed more efficiently into the heat transfer fluid and through the heat exchanger to the water with increased efficiency.

OBJECTS OF THE INVENTION

Accordingly, a primary object of the present invention is to provide a solar water heater which can reliably heat water over long periods of time without requiring maintenance or replacement.

Another object of the present invention is to provide a solar water heater which efficiently heats large volumes of water or other fluids in a relatively small space. Another object of the present invention is to provide a solar water heater which includes a heat control system to keep the solar water heater from exceeding maximum temperatures which would cause damage to components making up the solar water heater.

Another object of the present invention is to provide a solar water heater which can maintain a temperature of water therein over long periods of time when no solar radiation is incident upon the solar water heater.

Another object of the present invention is to provide a solar water heater which can preheat water entering a second water heater so that the second water heater utilizes less energy in boosting a temperature of water exiting the second water heater.

Another object of the present invention is to provide a solar water heater which efficiently heats water with solar radiation even when the solar radiation impacts the solar water heater at low angles of incidence.

Another object of the present invention is to provide a solar water heater which keeps the water within pathways enclosed by materials which are considered safe for drinking water.

Other further objects of the present invention will become apparent from a careful reading of the included drawing figures, the claims and detailed description of the invention.

BRIEF DESCRIPTION OF THE DRAWINGS

FIG. 4 is a schematic of the solar water heater of this invention and associated structures coupling the heater of this invention with a second water heater in a manner which would be typical for residential installation of the solar water heater of this invention.

FIG. 5 is a schematic of an alternative mobile solar water heater revealing how such a mobile solar water heater would be coupled to a second water heater to provide hot water on a mobile platform, such as on a recreational vehicle or houseboat.

FIG. 6 is a top plan view of a lens portion of the solar water heater of this invention.

FIG. 7 is a cross-sectional view of a portion of that which is shown in FIG. 6 showing details of the heat control valve with the heat control valve shown in an open position releasing air from an air trap beneath the lens of the solar water heater of this invention.

FIG. 8 is a sectional view similar to that which is shown in FIG. 7 but with the heat control valve closed.

DESCRIPTION OF THE PREFERRED EMBODIMENTS

Figure 1:
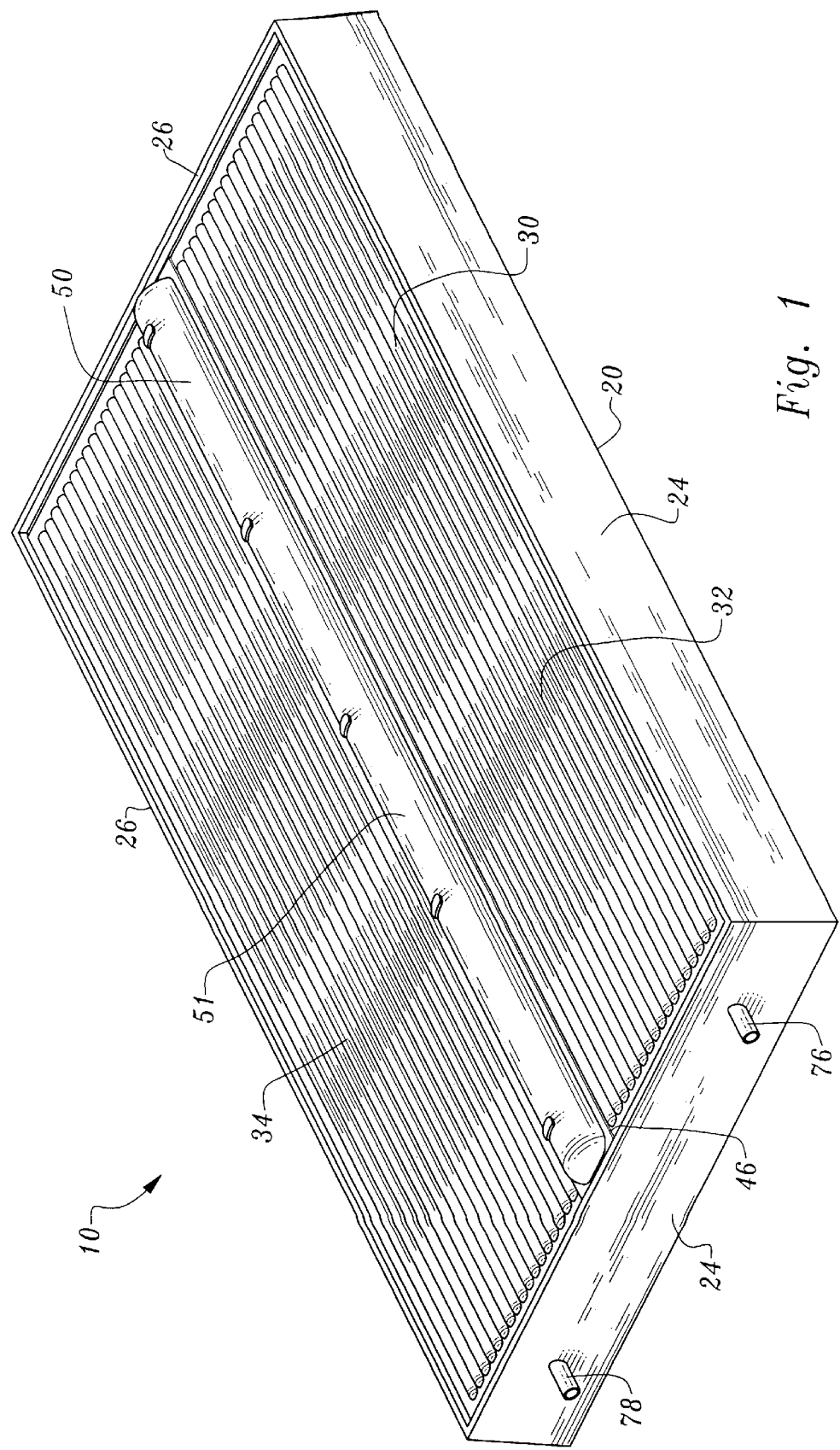
FIG. 1 is a perspective view of the solar water heater of this invention revealing an exterior appearance of the solar water heater.

Referring to the drawings, wherein like reference numerals represent like parts throughout the various drawing figures, reference numeral 10 is directed to a solar water heater (FIG. 1) according to a preferred embodiment of this invention. The solar water heater 10 is oriented in a position where solar radiation R, S, T (FIG. 2) impacts the solar water heater 10 and heats water W within an interior of the solar water heater 10. The solar water heater 10 can be used in a variety of different configurations but would typically be a preheater of water upstream of a second non-solar water heater 4 (FIG. 4) to reduce or eliminate an amount of energy consumed by the non-solar water heater 4 to output water at a desired high temperature.

Figure 2:
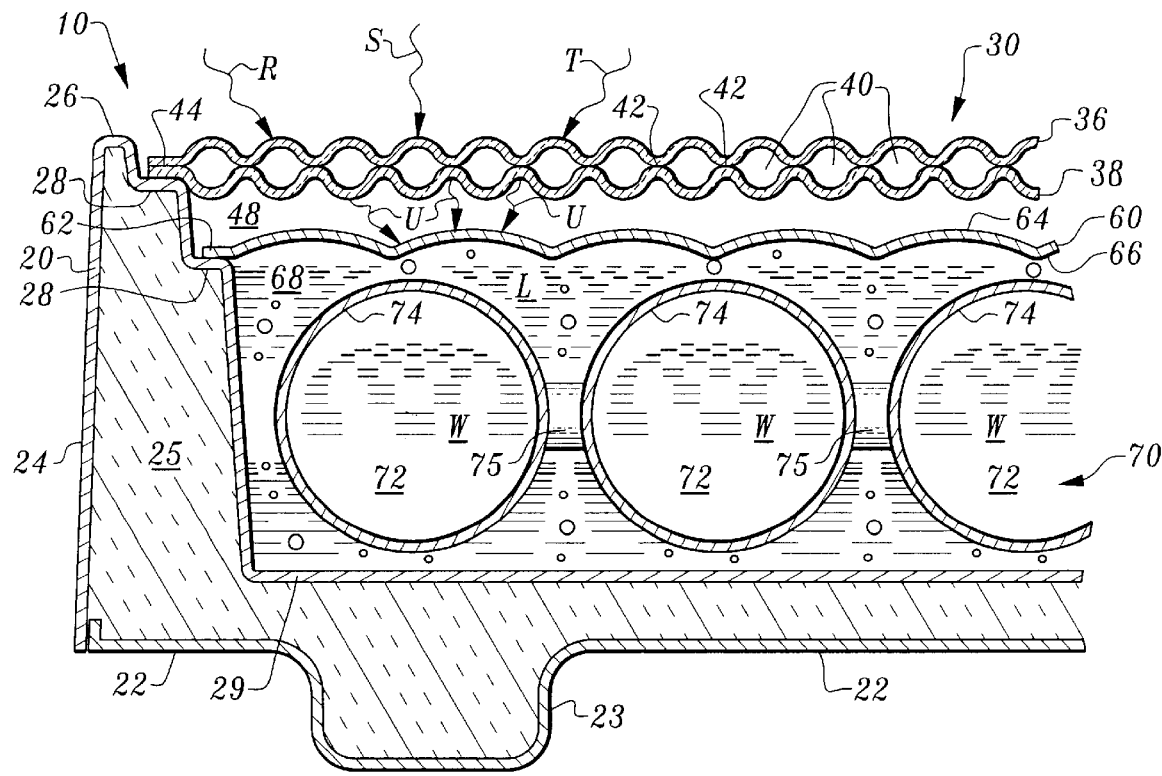
FIG. 2 is a full sectional view of a portion of that which is shown in FIG. 1 revealing the various different layers and interior details of the solar water heater of this invention.

In essence, and with particular reference to FIG. 2, basic details of the solar water heater 10 of this invention are described. The solar water heater 10 is contained within a housing 20 which has an insulated core 25 along sides and a floor of the housing 20, with a top portion of the housing 20 open. A lens 30 covers the opening in the housing 20. The lens 30 includes voids 40 therein which have an at least partial vacuum therein to reduce conduction heat transfer through the lens 30. Hence, solar radiation easily passes into the solar water heater 10 through the lens 30 but heat does not easily escape the solar water heater 10 by conduction through the lens 30 or by conduction through the insulated core 25 of the housing 20.

An air trap 48 is located below the lens 30 and above a heat absorption plate 60. The heat absorption plate 60 is configured to absorb a large portion of solar radiation incident upon the heat absorption plate 60 after passing through the lens 30. This heat absorbed by the heat absorption plate 60 is passed to the air in the air trap 48. A liquid space 68 is located below the heat absorption plate 60. Heat transfer occurs from the heat absorption plate 60 to a liquid L within the liquid space 68 adjacent and below the heat absorption plate 60.

A heat exchanger 70 is located within the liquid space 68. The heat exchanger 70 includes chambers 72 which include water W therein. The chambers 72 are joined to form a water W path through the heat exchanger 70. Heat thus travels from the heat absorption plate 60 to liquid L within the liquid space 68, and then into the water W within the chambers 72 of the heat exchanger 70.

A heat control valve 50 selectively opens the air trap 48 to air surrounding the solar water heater 10. The heat control valve 50 transitions to an open position when air within the air trap 48 reaches a maximum temperature above which damage would begin to occur to various different components of the solar water heater 10. When a temperature within the air trap 48 is below this maximum temperature, the heat control valve 50 closes and the air trap 48 is allowed to heat up and further insulate the water W within the heat exchanger 70 from heat loss and direct more heat out of the heat absorption plate 60 into the liquid space 68 and heat exchanger 70 for use in heating the water W.

More specifically, and with particular reference to FIG. 4, details of one possible overall water heating system including the solar water heater 10 of this invention is described. Typically, the solar water heater 10 would be located upon a roof 2 or in some other position where the solar water heater 10 experiences solar radiation against a top of the solar water heater 10. The solar water heater 10 is preferably positioned at an angle so that the solar water heater 10 has a high end and a low end. While the solar water heater 10 can be used alone, a most typical hot water heating system including the solar water heater 10 would additionally include a non-solar water heater 4 in line with the solar water heater 10. In this way, days with low levels of solar radiation and periods of excessive hot water use will not effect the supply of hot water by the overall system.

Typically, a cold water inlet 6 routes water (along arrow A) to the solar water heater 10 first and then out of the solar water heater 10 and into the non-solar water heater 4. The non-solar water heater 4 need only add additional heat to the water if a temperature of the water has not yet achieved the temperature desired.

Specifically, the cold water inlet 6 leads to a controller/valve 8. The controller/valve 8 is coupled to a cold water feed line 12 routed (along arrow B) to the solar water heater 10. A hot water feed line 14 exits the solar water heater 10 (along arrow C) and extends back to the controller/valve 8. A sleeve 16 can surround both the cold water feed line 12 and the hot water feed line 14 to capture any water which might leak from the lines 12, 14 and additionally insulate the lines 12, 14 such as to prevent freezing within the lines 12, 14 and assist in maintaining water temperatures within the lines 12, 14. The hot water feed line 14 exits the controller/valve 8 and enters the non-solar water heater 4 (along arrow D). A hot water outlet 18 exits the non-solar water heater 4 with the desired temperature having been obtained by the water leaving the hot water outlet 18 (arrow E).

The controller/valve 8 can include a bypass therein allowing water to go directly from the cold water inlet 6 to the non-solar water heater 4. Such a bypass might be used in extreme climates when cold weather and low solar radiation make it desirable to take the solar water heater 10 off line, or when the solar water heater 10 is undergoing maintenance. The controller/valve 8 can also include shut off valves and temperature sensors and flow rate meters which can supply information to gauges and other output devices or control systems so that the effectiveness and operational performance of the solar water heater 10 can be closely monitored and controlled.

Typically, the solar water heater 10 has a sufficiently large capacity for water W within the chamber 72 of the heat exchanger 70 (FIGS. 2 and 12) that the solar water heater 10 acts in both a "batch" mode and in a "continuous" mode. Specifically, when water W is not flowing through the system because no hot water is being used, water W (FIG. 2) remains stationary within the chamber 72 of the heat exchanger 70. If solar radiation is present, the water W will be heated until a maximum temperature is achieved. If no solar radiation is present, the solar water heater 10 is appropriately insulated so that little heat is lost while the water W is stored within the chamber 72 of the heat exchanger 70.

When water W is flowing through the system solar radiation heats the water W as it passes through the chambers 72 in the heat exchanger 70 so that the water W is heated as much as possible, up to its maximum temperature, before exiting the heat exchanger 70 of the solar water heater 10 and returning through the hot water feed line 14 to the non-solar water heater 4. If the water does not have a sufficiently high temperature when entering the non-solar water heater 4, the non-solar water heater 4 can boost the temperature of the water before exiting the hot water outlet 18 at the designed temperature for the overall system.

Typically, the roof 2 is sufficiently close in elevation to the non-solar water heater 4 that no pump is required to circulate water through the solar water heater 10. The water remains pressurized throughout the entire system. However, should a roof 2 of exceptional height or a particularly low water pressure be involved, an auxiliary pump can be provided to drive the water through the system.

With particular reference to FIG. 5, an analogous mobile solar water heater 110 is shown in a system which could be used on a top deck 112 of a recreational vehicle, houseboat or other mobile platform. The mobile solar water heater 110 would have a similar configuration to the solar water heater 10 of the preferred embodiment. Hence, a non-solar water heater 114 would preferably be provided in line with and downstream from the mobile solar water heater 110.

A cold inlet 116 would receive cold water (along arrow A'). This cold inlet 116 passes through a series of valves 118 and then typically to a cold water feed line 122 leading to the mobile solar water heater 110 (along arrow B'). After passing through the mobile solar water heater 110, the water exits along the hot water feed line 124 (along arrow C'). The water then passes through various valves 118 before being routed to the non-solar water heater 114 (along arrow D').

A bypass line 126 can be opened by adjustment of the valves 118 should it be desired that the cold water inlet 116 lead directly to the non-solar water heater 114 (along arrow D'). The water can be additionally heated if necessary within the non-solar heater 114 before being discharged through the hot water outlet 128 along arrow E'. The mobile solar water heater 110 preferably has a housing 129 which is streamlined to reduce drag on the vehicle supporting the mobile solar water heater 110.

Figure 3:
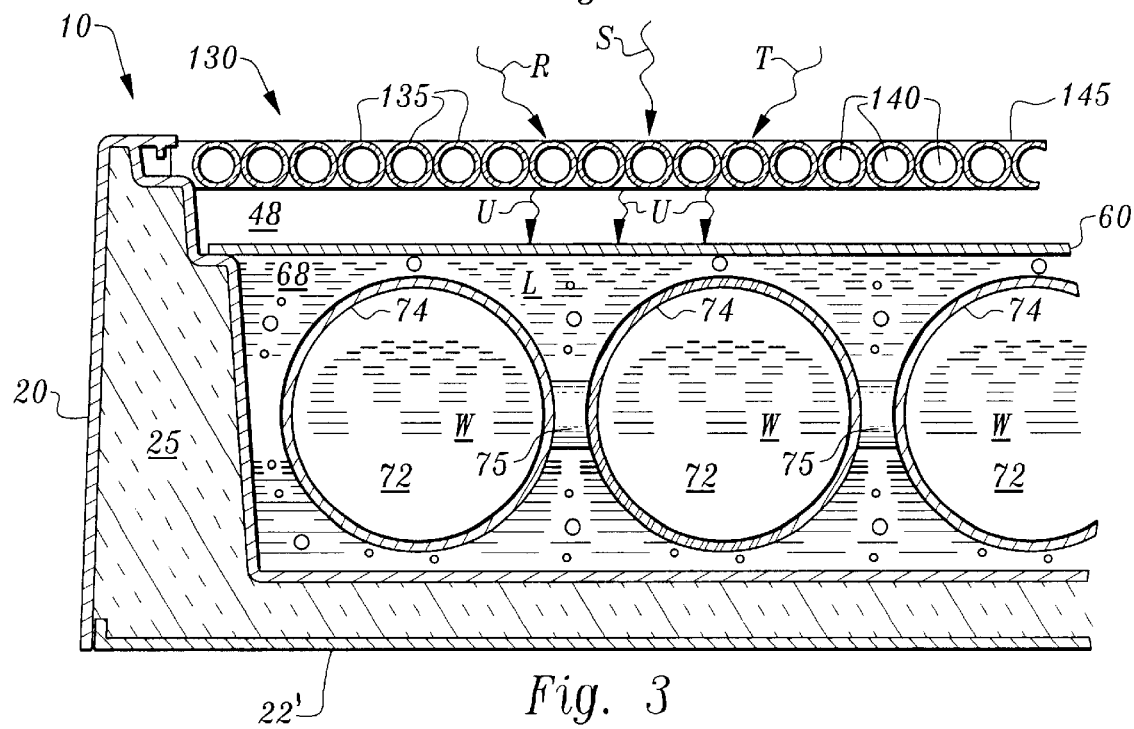
FIG. 3 is a full sectional view of a portion of an alternative solar water heater according to this invention.

With particular reference to FIGS. 1–3, details of the housing 20 of the solar water heater 10 are described. The housing 20 preferably includes the substantially planar base 22 which includes a pair of feet 23 (see also FIG. 4). The feet 23 typically support the base 22 of the housing 20 upon an underlying support surface, such as the roof 2 (FIG. 4). Alternatively, the base 22' can be planar as shown in FIG. 3. Side walls 24 extend substantially perpendicularly away from the base 22 and surround a periphery of the housing 20. The side walls 24 extend away from the base 22 up to a rim 26. A series of steps 26 extend down from the rim 26 toward a recess 29 preferably parallel with the base 22 and spaced only slightly from the base 22. A core 25 is defined by space between the base 22 and the various other surfaces of the housing 20. This core 25 is preferably filled with an insulating material, such as insulating foam. Preferably, the housing 20 forms a substantially rigid unitary construct when housing 20 construction is completed.

The base 22 can be formed separately from other non-base portions of the housing 20 with other portions of the housing 20 having a contour which facilitates their formation formed together in an injection molding or other molding process or casting process in an efficient low cost manner. The core 25 would then typically be filled with foam before finally placing the base 22 onto the housing 20 to complete the enclosure of the core 25.

The housing 20 can take on a variety of different configurations so long as the basic purposes of inhibiting lateral heat transfer out of the solar water heater 10 is provided and a sufficiently rigid structure is provided for supporting portions of the solar water heater 10 located within the recess 29 of the housing 20. The steps 28 conveniently provide surfaces for sealing attachment of the various different structures contained within the solar water heater 10.

With particular reference to FIGS. 1, 2 and 6, details of the lens 30 of the solar water heater 10 of this invention are described. The lens 30 is configured to maximize an amount of solar radiation transmitted into the solar water heater 10 through the lens 30 and to trap as much heat as possible within the solar water heater 10 below the lens 30.

Preferably, the lens 30 includes a left panel 32 and a right panel 34 (FIG. 6) which are of similar construction. Each panel 32, 34 is slightly less than half of a width of the housing 20 at the rim 26, with a gap 46 located between the panels 32, 34. The panels 32, 34 are preferably securely attached to the housing 20 adjacent the rim 26 so that the air trap 48 below the lens 30 is sealed beneath the lens 30 adjacent a perimeter of the panels 32, 34.

Each panel 32, 34 is preferably formed from a top plate 36 and a bottom plate 38 which are joined together. The top plate 36 preferably is non-planar so that solar radiation striking the top plate 36 at a low angle of incidence is still transmitted to a large degree through the lens 30, rather than being reflected off of the lens 30 and away from the solar water heater 10.

Preferably, the top plate 36 has an undulating form with a series of peaks and valleys. These peaks and valleys preferably extend vertically from a low end of the solar water heater 10 to a high end of the solar water heater 10 (FIG. 4). When the low end of the solar water heater 10 is oriented substantially directly south of the high end (for the northern hemisphere) these undulations in the top plate 36 help early morning sunlight (along arrow R of FIG. 2) and late afternoon sunlight (along arrow T of FIG. 2) to impact the peaks of the undulations in the top plate 36 and transmit solar radiation through the lens 30, rather than reflecting off of the top plate 36. Solar radiation S in FIG. 2 illustrates how higher angle of incidence solar radiation is also allowed to be transmitted through the top plate 36 of the lens 30.

The lens 30 also includes a bottom plate 38 beneath the top plate 36 and adjacent the top plate 36. Preferably, the bottom plate 38 also undulates in a pattern out of phase with the undulations in the top plate 36. In this way, a series of voids 40 and abutments 42 are provided between the top plate 36 and the bottom plate 38. A perimeter seal 44 seals the top plate 36 and bottom plate 38 securely together so that the voids 40 between the top plate 36 and bottom plate 38 do not communicate with space outside of the lens 30.

Preferably, air or other gases within the voids 40 are evacuated to a maximum extent practical so that an at least partial vacuum condition exists within the voids 40. Because the abutments 42 are not characterized by attachment between the plates 36, 38, air can flow between the voids 40 so that the voids 40 can all be evacuated simultaneously. Small standoffs can be provided at the abutments 42 to further facilitate evacuation of air or other gases out of the voids 40. Such standoffs would additionally minimize an amount of physical contact between the top plate 36 and bottom plate 38 and thus minimize a route for conduction heat transfer out of the solar water heater 10 through the lens 30.

Because conduction heat transfer requires a heat transfer medium, an at least partial vacuum condition between the top plate 36 and bottom plate 38 of the lens 30 inhibits conduction heat transfer through the lens 30. Additionally, the lens 30 can be formed from a material which transmits high energy thermal radiation (i.e. solar radiation) but which absorbs, or reflects low intensity thermal radiation, such as that accompanying the temperatures which would typically be experienced by structures within the solar water heater 10 and below the lens 30. In this way, both conduction and radiation heat transfer out of the solar water heater 10 through the lens 30 are minimized.

An alternative lens 130 is shown in FIG. 3. This alternative lens 130 utilizes a series of adjacent tubes with cylindrical tube walls 135 surrounding cylindrical voids 140. A generally undulating top surface is still provided for this alternative lens 130 for the benefits described above. An end plate 145 preferably holds the cylinders together. An evacuation system 150 is built into the end plate 145 for creating an at least partial vacuum condition within the cylindrical voids 140.

Figure 9:
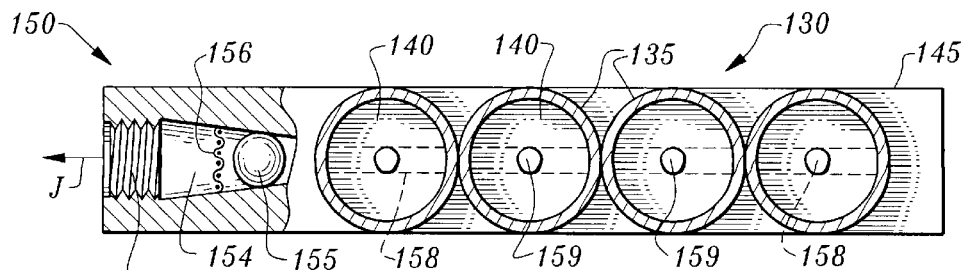
FIG. 9 is a sectional view of the alternative lens of FIG. 3 with portions cut away to reveal interior details of an evacuation system for evacuating the interior of voids within the alternative lens.

A vacuum fitting 152 (FIG. 9) can be coupled to a vacuum pump. A tapering bore 154 includes a check ball 155 therein which is trapped by a screen 156. A manifold 158 extends through the end plate 145 and includes a port 159 extending into each cylindrical void 140. As the vacuum pump draws air or other gases out of the cylindrical voids 140 through the ports 159 and manifold 158, the check ball 155 is pulled toward the screen 156 allowing these gases to pass the check ball 155. When the evacuation procedure is completed, the vacuum pump is removed from the vacuum fitting 152. Atmospheric pressure then pushes the check ball 155 against side walls of the tapering bore 154. The check ball 155 preferably has a sufficiently resilient sealing surface that the check ball 155 securely seals with the tapering bore 154 and maintains the vacuum condition within the cylindrical voids 140.

Preferably, the tube walls 135 of the alternative lens 130 are formed from acrylic. In the lens 30 of the preferred embodiment, the top plate 36 and bottom plate 38 are preferably formed from acrylic. However, any materials can be utilized which have the desired solar radiation and thermal radiation handling characteristics as well as appropriate weathering and durability characteristics to survive long duration direct exposure to solar radiation and extremes of temperature and weather.

With particular reference to FIGS. 1 and 6–8, details of the heat control valve 50 in the lens 30 are described. The heat control valve 50 is interposed between the air trap 48 and air surrounding the solar water heater 10. The heat control valve 50 could take on a variety of different configurations provided that it allows for air exchange between the air trap 48 and air surrounding the solar water heater 10 or some other space when opened, and substantially precludes such air transfer when closed. The heat control valve 50 is configured so that it is temperature sensitive. Particularly, when air within the air trap 48 achieves a desired maximum temperature the heat control valve 50 is caused to open so that air inside the air trap 48 can exchange with air outside of the air trap 48. In this way, a temperature of air within the air trap 48 is precluded from exceeding this maximum temperature. While a variety of different control systems could be utilized to monitor the temperature of air within the air trap 48, including thermal couples or other temperature sensors, the heat control valve 50 is preferably automatic and does not require a source of electricity to operate.

Typically, the higher the temperature within the air trap 48, the greater the amount of heat which can be transferred into water W within the heat exchanger 70 (FIG. 2). However, under some conditions the solar water heater 10 transfers so much heat into the water W and other structures within the solar water heater 10 that design maximum temperatures for the structures within the solar water heater 10 are exceeded and damage can be done to the various components within solar water heater 10, causing failure or degradation of performance and useful life of the solar water heater 10.

For instance, if the air within the air trap 48 reaches a sufficiently high temperature, the liquid L within the liquid space 68 could boil or the water W within the heat exchanger 70 could boil. Such boiling would significantly increase pressures within the solar water heater 10 and place undesirable stresses on the containment vessels which hold the liquid space 68 and the water W. Also, the absorption plate 60 and lens 30 are constructed of materials which suffer structural and heat transfer performance degradation when maximum design temperatures are exceeded.

While the heat control valve 50 can have a variety of different configurations, it is preferably configured as a cover 51 spanning the gap 46 between the left panel 32 and right panel 34 of the lens 30. The cover 51 includes lips 52 along extreme edges thereof which are spaced apart a distance similar to a width of the gap 46, but with the lips 52 overlapping onto edges of the panel 32, 34 slightly. A gasket seal 53 is preferably located on either the edges of the panel 32, 34 adjacent the gap 46 or on the lips 52 (or both) so that a substantially air tight seal can be provided between the lips 52 and the edges of the panels 32, 34 adjacent the gap 46.

A standoff support 54 is preferably interposed between the heat absorption plate 60 and the edges of the panels 32, 34 adjacent the gap 46. This standoff support 54 both maintains a depth of the air trap 48 between the absorption plate 60 and the panels 32, 34 of the lens 30 and provides a structure to support an actuation system for the cover 51 of the heat control valve 50. Specifically, an actuation system within the heat control valve 50 is preferably in the form of a heat expansion element 55 which is mounted to the standoff support 54. An actuator rod 56 is coupled to the heat expansion element 55 so that the actuator rod 56 extends up to and connects to the cover 51. The actuator rod 56 can be caused to move up away from the heat expansion element 55 when a design temperature for the heat expansion element 55 is exceeded. A return spring 57 is preferably in the form of a helical compression spring. This return spring 57 acts to bias the cover 51 toward its position abutting the lens 30 and causing the heat control valve 50 to be in a closed position unless the maximum temperature is exceeded.

The expansion element 55 is configured of a material which expands when a set temperature is exceeded. This expansion causes the actuator rod 56 to extend out of the heat expansion element 55. Preferably, the heat expansion element 55 is a E-05 Power Element such as that provided by Rostra Vernatherm of Bristol, Conn. The heat expansion element 55 returns to its original position when the threshold temperature is no longer met.

While the heat expansion element 55 can be configured to have primarily only an open position and a closed position, it is also conceivable that the heat expansion element 55 would have a heat expansion characteristic by which the amount of opening of the cover 51 progressively increases as a temperature within the air trap 48 increases. Such a variable heat expansion element 55 would allow a greater and greater amount of air exchange into and out of the air trap 48 for cooling of air within the air trap 48 as the temperature increases.

The cover 51 is preferably in the form of a semi-cylinder extending from the low end to the high end of the solar water heater 10, covering the gap 46 (FIG. 1). Because the solar water heater 10 is preferably angled, the gap 46 occluded by the cover 51 has higher and lower elevation portions. A series of heat expansion elements 55 (such as five as shown in FIG. 1) are oriented along the cover 51. When the heat control valve 50 is in the open position, this elevation variability of the gap 46 encourages natural convection between air within the air trap 48 and air outside of the solar water heater 10. Specifically, the hotter air within the air trap 48 rises and tends to come out of the gap 46 near the high end of the solar water heater 10. Colder air outside of the solar water heater 10 is thus tended to be drawn into the air trap 48 through the gap 46 near the low end of the solar water heater 10. When the heat control valve 50 is in the closed position and the cover 51 occludes the gap 46, air within the air trap 48 can again commence increasing in temperature to maximize an amount of insulation and heat transfer from the absorption plate 60 into the liquid space 68 below the absorption plate 60.

Figure 11:
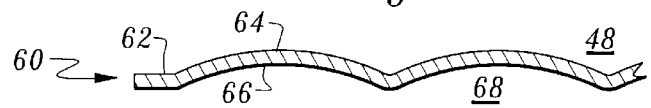
FIG. 11 is a sectional view of a portion of that which is shown in FIG. 10.
Figure 10:
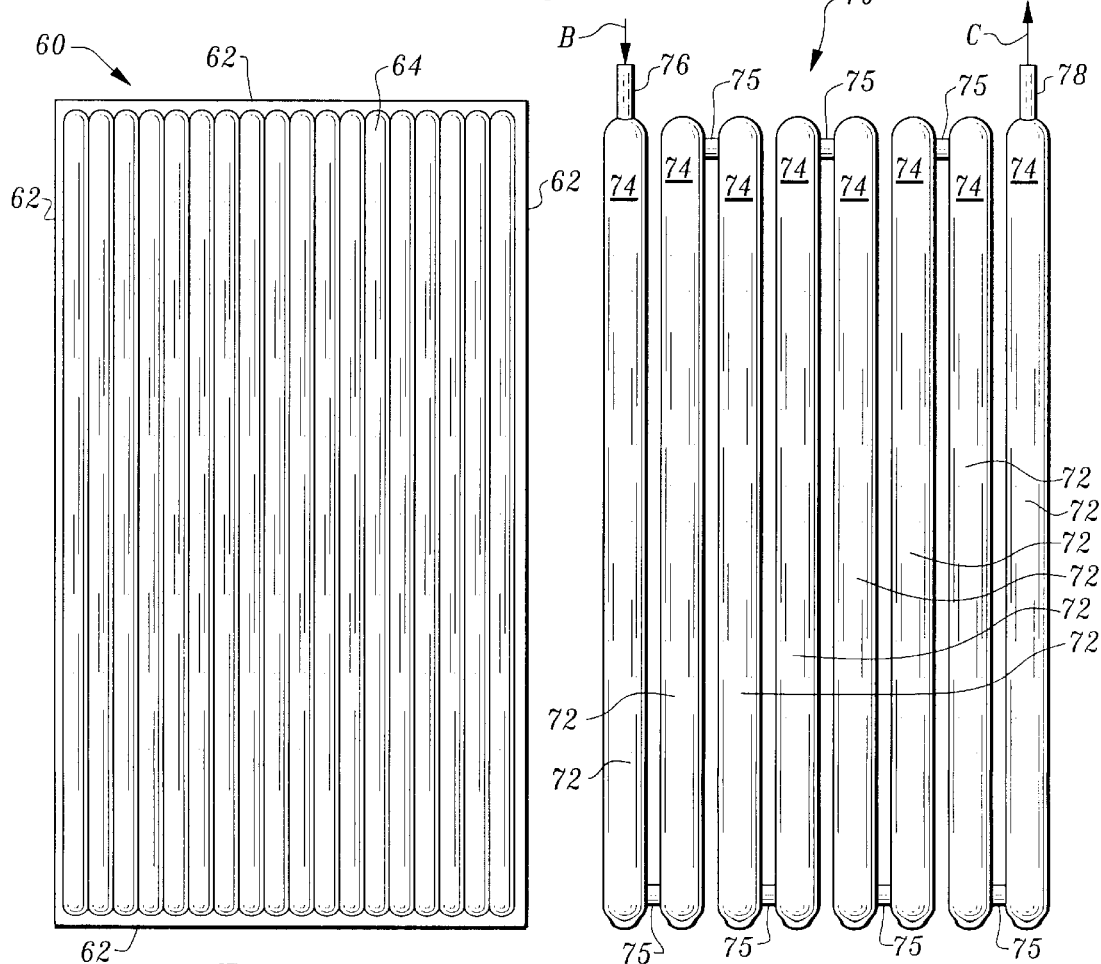
FIG. 10 is a top plan view of a heat absorption plate of this invention.

With particular reference to FIGS. 2, 10 and 11, details of the heat absorption plate 60 are described. The heat absorption plate 60 is preferably formed from a material which absorbs substantially all incident radiation striking the heat absorption plate 60. The heat absorption plate 60 thus converts the radiant solar energy into heat energy in the form of increased temperature for the heat absorption plate 60. The heat absorption plate 60 is preferably formed of ABS plastic with a black color to maximize absorption of the incident solar radiation. Other materials having higher radiation absorption characteristics than the radiation absorption characteristics of all materials on average would also tend to provide some of the benefit of the absorption plate 60, albeit to a lesser degree.

The heat absorption plate 60 has a peripheral edge 62 shaped similar to a second step in the steps 28 of the housing 20. The peripheral edge 62 thus encloses a lower portion of air trap 48 and keeps the air trap 48 above the heat absorption plate 60. The heat absorption plate 60 has a top surface 64 adjacent the air trap 48 and a bottom surface 66 adjacent the liquid space 68. The liquid space 68 is preferably substantially filled so that liquid L from the liquid space 68 is in direct conduction heat transfer contact with the bottom surface 66 of the heat absorption plate 60.

The heat absorption plate 60 is substantially planar (FIG. 3) but can include some slight undulations. Such slight undulations (FIG. 11) can assist the absorption plate in flexing and expanding somewhat, such as due to thermal expansion when heated, and still maintain a secure seal between the peripheral edge 62 of the heat absorption plate 60 and the steps 28 of the housing 20. This seal can thus maintain sufficient strength to keep liquid L within the liquid space 68.

Figure 12:
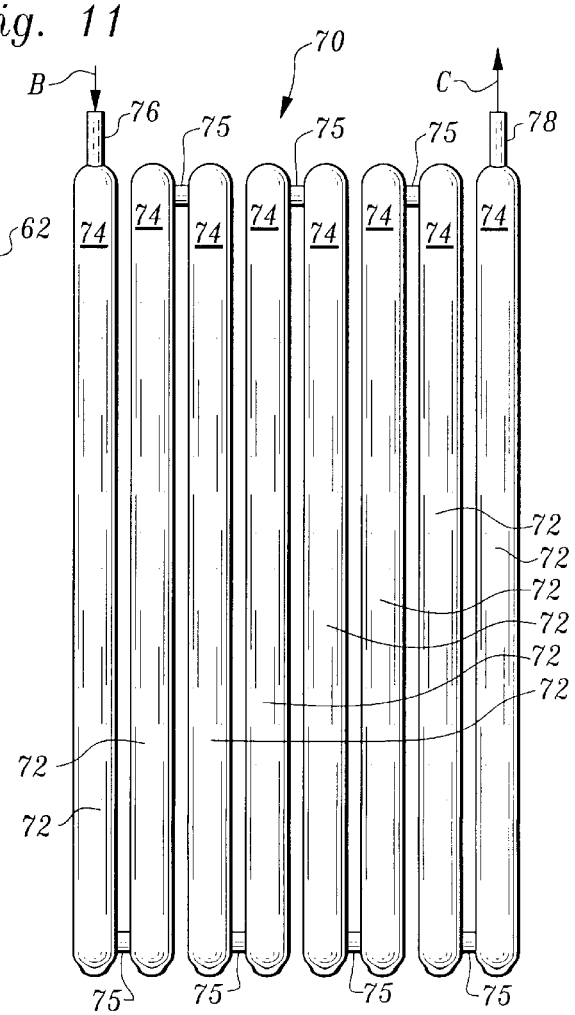
FIG. 12 is a top plan view of a heat exchanger portion of this invention.

With particular reference to FIGS. 2 and 12, details of the heat exchanger 70 are described. The heat exchanger 70 carries water W through the liquid space 68 and keeps the water W spaced from liquid L within the liquid space 68 while allowing heat transfer into the water W from the liquid L within the liquid space 68. Heat exchanger 70 preferably includes a series of cylindrical chambers 72 oriented parallel to each other and extending from the low end of the solar water heater 10 to the high end of the solar water heater 10 within the recess 29 of the housing 20. The chambers 72 have walls 74 which can handle water W without tainting the drinkability or other characteristics of the water W. The walls 74 also preferably have a low resistance to heat transfer. Preferably, the walls 74 are made from high density polyethylene which provides a compromise between long life and durability with a sufficiently low resistance to heat transfer and inert characteristics when handling water so that the water W is not tainted in any way. Junctions 75 join adjacent chambers 72 together. Preferably, the junctions 75 are oriented in an alternating pattern (FIG. 12) so that a serpentine path is provided for the water W between the entrance 76 (along arrow B) to the exit 78 (along arrow C).

The liquid L within the liquid space 68 can be any of a variety of different liquids. Preferably, the liquid L has a lower freezing point than water and a higher thermal capacitance than water. Salt water is one acceptable material for the liquid L. In this way, the liquid L can tend to discourage freezing of water W within the heat exchanger 70 and the liquid L itself when temperatures near freezing for water are experienced by the solar water heater 10. The solar water heater 10 is configured to keep the water W at a high temperature overnight so that the solar water heater 10 is still supplying preheated hot water to the non-solar water heater 4 the next morning. Because the solar water heater 10 includes the liquid space 68 therein with a liquid L preferably having a high thermal capacitance, heat is stored not only in the water W within the chamber 72 of the heat exchanger 70, but also is stored within the liquid L within the liquid space 68.

Preferably, the chambers 72 account for approximately half of the volume of the entire liquid space 68 below the heat absorption plate 60 and within the recess 29 of the housing 20. Hence, after water W begins to flow out of the solar water heater 10, new water W being brought into the heat exchanger 70 (along arrow B of FIG. 12) draws heat from the liquid L within the liquid space 68, even if solar radiation has not begun to impact the solar water heater 10 and additional solar heating has not yet begun. In this way, a capacity of the solar water heater 10 is significantly greater than a volume of the chamber 72 within the heat exchanger 70.

In use and operation, and with particular reference to FIGS. 2 and 4, details of the performance of the solar water heater 10 are described. Initially, the solar water heater 10 is preferably installed in a manner similar to that shown in FIG. 4. Water is then allowed to enter the system, by first entering along the cold water inlet 6 (arrow A) and then through the controller/valve 8 and into the cold water feed line 12 (along arrow B) before entering the heat exchanger 70 of the solar water heater 10 at the entrance 76 (FIG. 12). The water continues to flow until all of the chambers 72 are full. The water then exits from the heat exchanger 70 through the exit 78 (along arrow C) and then along the hot water feed line 14, back through the controller/valve 8 and into the non-solar water heater 4 (along arrow D). A hot water outlet 18 then releases hot water from the non-solar water heater 4 along arrow E. When no solar radiation is impacting the solar water heater 10, a temperature of the water entering the non-solar water heater 4 (along arrow D) is similar to a temperature of water entering the cold water inlet 6 (along arrow A). At this time, no solar heat is being added to the water and the non-solar water heater 4 must do all heating of the water necessary to bring a temperature of the water exiting the hot water outlet 18 (at arrow E) to a desired hot water temperature.

When the sun first begins to impact the lens 30 of the solar water heater 10, it typically has a low angle of incidence (arrow R of FIG. 2). Because the lens 30 has undulations in the top plate 36, a significant portion of the incident radiation R is transmitted through the lens 30 and not reflected. As the sun rises higher, the solar radiation strikes at a more perpendicular angle to the lens 30 (arrow S of FIG. 2). An even greater amount of solar radiation S is transmitted through the lens 30 at this more perpendicular angle. In the afternoon, the solar radiation again strikes the lens 30 at a low angle of incidence and the undulations in the top plate 36 assist the solar radiation (arrow T of FIG. 2) in still being largely transmitted through the lens 30.

The solar radiation continues beyond the lens 30 (along arrows U) until the solar radiation strikes the heat absorption plate 60. A relatively trivial amount of the solar radiation U is absorbed by air within the air trap 48.

The heat absorption plate 60 is configured to absorb substantially all incident radiation U striking the top surface 64 of the heat absorption plate 60. The heat absorption plate 60 thus increases in temperature. The heat absorption plate 60 is in direct conduction heat transfer contact with both the liquid L within the liquid space 68 and the air within the air trap 48. Thus, heat is transferred from the heat absorption plate 60 into air within the air trap 48 and into the liquid L within the liquid space 68.

The liquid L and the air within the air trap 48 are thus heated primarily by conduction heat transfer from the heat absorption plate 60. Within the heat exchanger 70, the temperature of the liquid L causes heat to be transferred through the walls 74 of the chambers 72 and then to the water W within the heat exchanger 70. In this way, the water W is heated. If the water W is continuing to flow through the heat exchanger 70, the water W exiting the solar water heater 10 (along arrow C) then enters the non-solar water heater 4 (along arrow D) at a higher temperature than when the water entered the cold water inlet 6 (arrow A). Thus, the non-solar water heater 4 need utilize less energy than would otherwise be the case to keep the water W at a desired outlet temperature for water in the hot water outlet 18 (arrow E).

When sufficient solar radiation is striking the solar water heater 10, this heat is transferred from the heat absorption plate 60 to the liquid L and then to the water W sufficiently so that the water W entering the non-solar water heater 4 (along arrow D) has already achieved the desired temperature for the hot water outlet 18 (arrow E). When this condition exists, the non-solar water heater 4 does not require any additional energy and merely acts as an additional reservoir for hot water and a pathway for directing the hot water from the solar water heater 10 along to the hot water outlet 18 (along arrow E).

During periods when the solar radiation R, S, T is particularly great, it is conceivable that too much solar heating of the water W will occur and that the various different portions of the solar water heater 10 will exceed their designed maximum temperature. To keep such excessive temperatures from being reached by the solar water heater 10, the heat control valve 50 is provided. For instance, if the maximum desirable water temperature for the solar water heater 10 is 165° F., it can be calculated what the maximum temperature should be within the air trap 48.

For instance, when air within the air trap 48 is found to be approximately 165° F. the liquid L within the liquid space 68 and the water W within the heat exchanger 70 is approximately 165° F. If the temperature of the air within the air trap 48 is reduced below 165° F. the heat absorption plate 60 will transmit more heat into the air within the air trap 48 than into the liquid L within the liquid space 68. Cooler air within the air trap 48 will also tend to cool the heat absorption plate 60 and keep the liquid L within the liquid space 68 from continuing to increase in temperature.

To cool the air within the air trap 48, the heat control valve 50 can be opened, causing cooler air outside the solar water heater 10 to pass into the air trap 48. This cooler air will cool the heat absorption plate 60 somewhat and cause more heat to be transferred from the heat absorption plate 60 into air within the air trap 48 than into the liquid L within the liquid space 68. Temperature of the water W within the heat exchanger 70 can thus be maintained at approximately 165° F.

If a higher temperature is desired for the water W, higher temperatures for the air within the air trap 48 can be provided for by modifying the heat expansion element 55 of the heat control valve 50. Alternatively, if cooler water W maximum temperatures are desired, the heat control valve 50 can be adjusted to open the cover 51 at a lower air trap 48 air temperature.

When the solar radiation striking the heat absorption plate 60 begins to decrease (i.e. in the late afternoon or when clouds block the sun) a temperature of air within the air trap 48 is decreased and the cover 51 of the heat control valve 50 is closed. The air within the air trap 48 can then increase in temperature to an amount possible by the continuing solar radiation entering the solar water heater 10. Because the lens 30 is configured with voids 40 which have an at least partially vacuum condition, very little heat is transferred out of the air trap 48 through the lens 30 by conduction. The air trap 48 thus acts as an insulating layer to keep the heat absorption plate 60 and adjacent liquid L within the liquid space 68 warm, even when solar radiation is reduced or ceases.

Additionally, the insulation within the core 25 of the housing 20 keeps the liquid L and water W from losing excessive amounts of heat by conduction heat transfer out of the solar water heater 10. This insulation of the solar water heater 10 allows the solar water heater 10 to act as a insulated water W storage tank for periods when solar radiation is not present, such as overnight. Should hot water be needed before solar radiation is again striking the solar water heater 10, this stored hot water W within the heat exchanger 70 of the solar water heater 10 is accessed through the non-solar water heater 4 so that the non-solar water heater 4 need not utilize energy to deliver hot water out of the hot water outlet 18 (along arrow E). The liquid L can then heat additional water passing into the heat exchanger 70, until the liquid L has cooled. If all of the hot water W and heat within the hot liquid L stored within the heat exchanger 70 of the solar water heater 10 is used up, the non-solar water heater 4 can again be activated to boost a temperature of the water W so that a water temperature that is desired for the hot water outlet 18 (arrow E) can be maintained.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A solar water heater, comprising in combination:
a water containing space;
a lens positioned between said water containing space and the sun;
an air space between said lens and said water containing space;
a heat control valve between said air space and air outside of said air space, said heat control valve set to open said air space to air outside of said air space when a set temperature is exceeded by the air within said air space; and
wherein said heat control valve passes through said lens, such that air exchange occurs between air in said air space and air above said lens when said valve is open.

2. The water heater of claim 1 wherein said valve is configured to include a cover having a width between two lips at least as great as a gap in said lens, said lips configured to abut said lens when said valve is in a closed position.

3. The water heater of claim 2 wherein said heat control valve spans multiple elevations when open, such that natural convection of air through said valve is enhanced relative to a heat control valve of similar size having a single elevation;
wherein said lens is slanted to include a high end and a low end, said valve selectively closing said gap extending at least partially between said low end of said lens and said high end of said lens;
wherein a heat absorbing plate is interposed between said air space and said water containing space; and
wherein a liquid space is located between said heat absorbing plate and said water containing space, said liquid space including a liquid therein, said liquid abutting said heat absorbing plate and a walled enclosure between said liquid space and said water containing space.

4. A solar water heater, comprising in combination:
a water containing space;
a lens positioned between said water containing space and the sun;
an airspace between said lens and said water containing space;
a heat control valve between said air space and air outside of said air space, said heat control valve set to open said air space to air outside of said air space when a set temperature is exceeded by the air within said air space;
wherein said heat control valve spans multiple elevations when open, such that natural convection of air through said valve is enhanced relative to a heat control valve of similar size having a single elevation; and
wherein said lens is slanted to include a high end and a low end, said valve selectively closing a gap extending at least partially between said low end of said lens and said high end of said lens.

5. A solar water heater comprising in combination:
a water containing space;
a lens positioned between said water containing space and the sun;
said lens having at least one void therein, said void isolated from adjacent spaces outside of said lens, said void having an at least partial vacuum condition relative to the adjacent spaces, such that a rate of conduction heat transfer through said lens is reduced relative to a rate without said vacuum condition;
wherein said lens has a non-planar top surface;
wherein said lens has an undulating top plate; and
wherein said lens includes an undulating bottom plate, said undulating bottom plate and said undulating top plate touching each other at abutments where undulations in said undulating top plate and undulations in said bottom plate come together, and wherein said lens includes a plurality of said voids between said undulating top plate and said undulating bottom plate at spaces between said abutments, said voids having an at least partial vacuum condition relative to air above said undulating top plate.

6. The solar water heater of claim 5 wherein an air space is located between said lens and said water containing space; and
wherein a heat absorbing plate is located between said air space and said water containing space, said heat absorbing plate in conduction heat transfer contact with said water containing space such that conduction heat transfer can occur between said heat absorbing plate and water within said water containing space.

7. A solar water heater, comprising in combination:
a water containing space;
a lens positioned between said water containing space and the sun;
an air space between said lens and said water containing space;
a heat control valve between said air space and air outside of said air space, said heat control valve set to open said air space to air outside of said air space when a set temperature is exceeded by the air within said air space;

wherein said air space is configured as an air trap which is substantially enclosed except when said heat control valve is open;

wherein said heat control valve spans multiple elevations when open, such that natural convection of air through said valve is enhanced relative to a heat control valve of similar size having a single elevation; and wherein said heat control valve passes through said lens, such that air exchange occurs between air in said air space and air above said lens when said valve is open.

8. The water heater of claim 7 wherein said lens is slanted to include a high end and a low end, said valve selectively closing a gap extending at least partially between said low end of said lens and said high end of said lens.

9. The water heater of claim 8 wherein said valve is configured to include a cover having a width between two lips at least as great as said gap, said lips configured to abut said lens when said valve is in a closed position.

10. The water heater of claim 9 wherein said gap is located at a midpoint between left and right panels of said lens and extends a majority of a distance from said high end of said lens to said low end of said lens.

11. A solar water heater comprising in combination:

a water containing space;

a lens positioned between said water containing space and the sun;

said lens having at least one void therein, said void isolated from adjacent spaces outside of said lens, said void having an at least partial vacuum condition relative to the adjacent spaces, such that a rate of conduction heat transfer through said lens is reduced relative to a rate without said vacuum condition;

wherein an enclosable air space is located between said lens and said water containing space; and wherein said enclosable air space includes a gap between said enclosable air space and air surrounding the solar water heater, said gap having a valve therein, said valve selectively opening and closing said enclosable air space relative to air surrounding the solar water heater;

wherein said valve includes a closed position closing said gap and an open position exposing said gap, said valve biased toward said closed position;

wherein said valve includes a cover, said valve including a heat expansion element adjacent said cover, said heat expansion element configured to expand against said cover and lift said cover to move said valve from said closed position to said open position when said heat expansion element experiences a threshold temperature, such that said valve is moved from said closed position to said open position when said heater transfer element exceeds a preselected maximum temperature;

wherein said heat expansion element is located within said air space in a manner keeping a temperature of said heat expansion element and air within said air space similar to each other; and wherein said lens has a non-planar top surface, said lens divided into at least two panels with said gap between said air space and air surrounding said solar water heater, said gap located between said at least two panels, said cover of said valve located spanning said gap.

* * * * *